United States Patent
Abdel-Samad et al.

(10) Patent No.: US 10,178,703 B2
(45) Date of Patent: Jan. 8, 2019

(54) STOPPING A RANDOM ACCESS PROCEDURE

(71) Applicant: Research in Motion Limited, Waterloo (CA)

(72) Inventors: Ayman Ahmed Mahmoud Abdel-Samad, Waterloo (CA); Dinesh Kumar Arora, Kitchener (CA); Mohamed Galal El-Din Ebrahim, Kitchener (CA); Takashi Suzuki, Ichikawa (JP); Eswar Vutukuri, Havant (GB)

(73) Assignee: BlackBerry Limited, Waterloo, Ontario (CA)

( * ) Notice: Subject to any disclaimer, the term of this patent is extended or adjusted under 35 U.S.C. 154(b) by 309 days.

(21) Appl. No.: 13/890,448

(22) Filed: May 9, 2013

(65) Prior Publication Data

US 2014/0334389 A1   Nov. 13, 2014

(51) Int. Cl.
*H04W 74/08* (2009.01)
*H04W 76/06* (2009.01)
*H04W 74/00* (2009.01)
*H04W 76/30* (2018.01)
*H04W 76/19* (2018.01)

(52) U.S. Cl.
CPC ......... *H04W 76/06* (2013.01); *H04W 74/004* (2013.01); *H04W 76/30* (2018.02); *H04W 76/19* (2018.02)

(58) Field of Classification Search
USPC .................. 370/329, 328, 447, 461
See application file for complete search history.

(56) References Cited

U.S. PATENT DOCUMENTS

| | | | | |
|---|---|---|---|---|
| 2007/0230600 A1* | 10/2007 | Bertrand et al. | ............... | 375/260 |
| 2008/0125043 A1* | 5/2008 | Karmanenko | ........ | H04W 12/10 |
| | | | | 455/41.2 |
| 2008/0232283 A1* | 9/2008 | Jen | ...................... | H04W 74/006 |
| | | | | 370/310 |
| 2008/0233940 A1* | 9/2008 | Jen | ...................... | H04W 74/004 |
| | | | | 455/418 |
| 2010/0067457 A1* | 3/2010 | Wang | .............. | H04W 72/00406 |
| | | | | 370/329 |

(Continued)

FOREIGN PATENT DOCUMENTS

| | | | | |
|---|---|---|---|---|
| JP | WO 2012136291 A2 * | 10/2012 | ............ | H04W 4/005 |
| WO | WO 2012134138 A2 * | 10/2012 | ............. | H04L 5/001 |

(Continued)

OTHER PUBLICATIONS

Qualcomm Incorporated, R2-125329, LTE UE Uplink Out-of-Sync Handling, 3GPP TSG-RAN WG2 Meeting #80, New Orleans, The USA, Nov. 12-16, 2012, whole document.*

(Continued)

*Primary Examiner* — Andrew W Chriss
*Assistant Examiner* — Jose L Perez
(74) *Attorney, Agent, or Firm* — Trop, Pruner & Hu, P.C.

(57) ABSTRACT

A wireless access network node receives, from a user equipment (UE), information relating to a random access procedure. The wireless access network node sends, to the UE, an indication to stop the random access procedure, based on the received information.

23 Claims, 8 Drawing Sheets

(56) References Cited

U.S. PATENT DOCUMENTS

| | | | |
|---|---|---|---|
| 2010/0067498 A1* | 3/2010 | Lee | H04W 74/006 370/336 |
| 2010/0080116 A1* | 4/2010 | Agashe | H04W 36/08 370/216 |
| 2010/0128648 A1* | 5/2010 | Lee | H04W 74/002 370/312 |
| 2010/0272035 A1* | 10/2010 | Park | H04W 74/0866 370/329 |
| 2011/0261763 A1* | 10/2011 | Chun | H04W 74/008 370/329 |
| 2012/0003977 A1* | 1/2012 | Iwamura | H04W 36/0033 455/436 |
| 2012/0039167 A1* | 2/2012 | Swaminathan | H04W 76/026 370/225 |
| 2012/0069728 A1* | 3/2012 | Jung | H04W 76/027 370/216 |
| 2012/0082105 A1* | 4/2012 | Hwang et al. | 370/329 |
| 2012/0270540 A1* | 10/2012 | Ode et al. | 455/426.1 |
| 2012/0275381 A1* | 11/2012 | Kim | H04W 74/08 370/328 |
| 2013/0178204 A1* | 7/2013 | Zhang | H04W 36/0083 455/423 |
| 2013/0188473 A1* | 7/2013 | Dinan | H04W 56/0005 370/216 |
| 2014/0016593 A1* | 1/2014 | Park | H04L 5/001 370/329 |
| 2014/0362794 A1* | 12/2014 | Zhao | H04W 56/0045 370/329 |
| 2015/0282241 A1* | 10/2015 | Bergius | H04W 76/027 370/329 |

FOREIGN PATENT DOCUMENTS

| | | | |
|---|---|---|---|
| WO | WO 2012136291 A2 * | 10/2012 | |
| WO | WO 2013137545 A1 * | 9/2013 | |
| WO | WO 2013141600 A1 * | 9/2013 | H04W 28/0205 |

OTHER PUBLICATIONS

Pfaffenberger, Webster's New World Computer Dictionary, entry for "Central Processing Unit", Hungry Minds, Inc., Ninth Edition, 2001, p. 68.*

3rd Generation Partnership Project; Technical Specification Group Radio Access Network; Evolved Universal Terrestrial Radio Access (E-UTRA); Radio Resource Control (RRC); Protocol specification (Release 11), 3GPP TS 36.331 V11.3.0 (Mar. 2013), pp. 14, 57-59, 145-146.*

3GPP TS 36.331 V11.3.0; Technical Specification; 3rd Generation Partnership Project; Technical Specification Group Radio Access Network; Evolved Universal Terrestrial Radio Access (E-UTRA); Radio Resource Control (RRC); Protocol specification (Release 11); (Mar. 2013); (344 pages).

3GPP TS 36.304 V11.3.0; Technical Specification; 3rd Generation Partnership Project; Technical Specification Group Radio Access Network; Evolved Universal Terrestrial Radio Access (E-UTRA); User Equipment (UE) procedures in idle mode; (Release 11) (Mar. 2013) (34 pages).

3GPP TS 36.321 V11.2.0; Technical Specification; 3rd Generation Partnership Project; Technical Specification Group Radio Access Network; Evolved Universal Terrestrial Radio Access (E-UTRA); Medium Access Control (MAC) protocol specification (Release 11) (Mar. 2013) (56 pages).

3GPP TSG-RAN WG2 Meeting #80; R2-125329; New Orleans, The USA; Agenda Item: 6; Source: Qualcomm Incorporated; Title: LTE UE Uplink Out-of Sync Handling; Document for: Discussion and decision; (Nov. 12, 2012); (5 pages).

3GPP TSG-RAN WG2 Meeting #81; R2-130144; Agenda item: 6.1; Source: Qualcomm Incorporated; Title: LTE UE RRC State Mismatch Handling; Document for: Discussion and decision; (Feb. 1, 2013) (2 pages).

* cited by examiner

STOPPING A RANDOM ACCESS PROCEDURE

BACKGROUND

A user equipment (UE) in a mobile communications network can be in an idle state or a connected state. A UE that is in a connected state maintains its radio connection with the network, and the UE is able to exchange user plane data with the network over the radio connection.

A UE in the idle state does not maintain a radio connection with the network, and thus is unable to exchange user plane data with the network while the UE is in the idle state. The network can release radio resources associated with the UE when the network instructs the UE to transition from a connected state to an idle state.

A random access procedure can be performed by a UE to associate with the network and to acquire resources in the network in various scenarios. In a first scenario, the UE can initiate a random access procedure when the UE is in its idle state and the UE requires a connection to the network because either a paging message has been sent from the network or due to the arrival of uplink data that is to be sent to the network. In a second scenario, a random access procedure can be performed as part of handover from a first cell to a second cell. There can be other scenarios in which the UE can initiate a random access procedure.

BRIEF DESCRIPTION OF THE DRAWINGS

Some embodiments are described with respect to the following figures.

DETAILED DESCRIPTION

Figure 1:
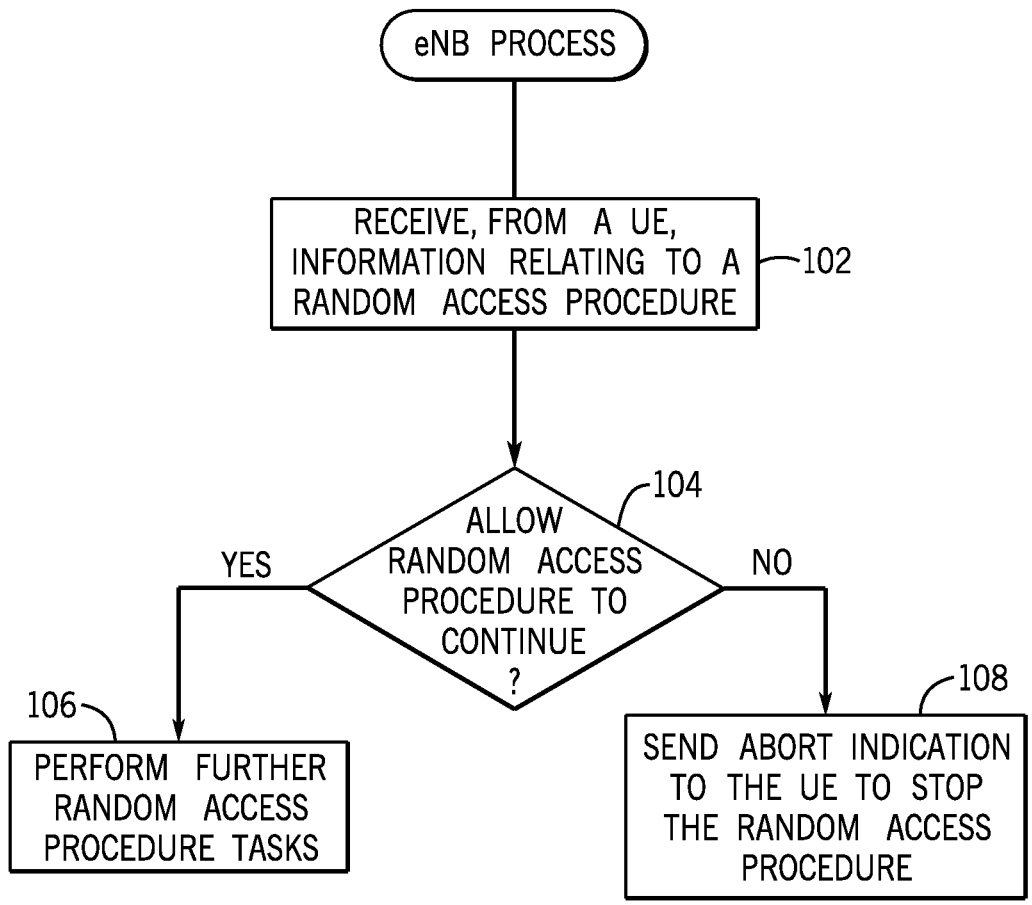
FIG. 1 is a flow diagram of a process performed by a wireless access network node, according to some implementations.

In the ensuing discussion, reference is made to mobile communications networks that operate according to the Long-Term Evolution (LTE) standards as provided by the Third Generation Partnership Project (3GPP). The LTE standards are also referred to as the Evolved Universal Terrestrial Radio Access (E-UTRA) standards.

Although reference is made to E-UTRA in the ensuing discussion, it is noted that techniques or mechanisms according to some implementations can be applied to other wireless access technologies. For example, such other wireless access technologies can include the Universal Mobile Telecommunications System (UMTS) technology, which is also referred to as the Universal Terrestrial Radio Access (UTRA), or another type of wireless access technology.

In an E-UTRA mobile network, the idle state of a user equipment (UE) can include a Radio Resource Control (RRC) idle state (RRC_IDLE), while a connected state of the UE can include one of several states in an RRC connected state (RRC_CONNECTED). In the RRC connected state, the UE can be at one of several (sub)states that are each associated with different levels of power consumption by the UE and/or uplink synchronization status. The RRC_IDLE and the RRC_CONNECTED states are defined by the RRC protocol, as described in the 3GPP TS 36.331 Specification, for example.

An RRC layer is included in each of a UE and a wireless access network node of the mobile communications network, where the RRC layer handles control plane signaling between the UE and the wireless access network node. Control plane signaling can be used to establish or release a connection and a radio bearer, broadcast system information, perform a mobility procedure, and/or perform other tasks.

In an E-UTRA network, a wireless access network node that provides a coverage area for wireless communications with UEs is referred to as an enhanced Node B (eNB). An eNB can include functionalities of a base station and base station controller. The ensuing discussion refers to eNBs. In other examples, techniques or mechanisms according to some implementations can be applied to other types of wireless access network nodes.

Also, although the ensuing discussion refers to the RRC idle state and RRC connected state as examples of an idle state and connected state of a UE, it is noted that in other examples, a UE can have an idle state and connected state defined according to another protocol.

In the RRC idle state, no radio connection is established between the UE and the wireless access network node. On the other hand, in the RRC connected state, a radio connection is established between the UE and the wireless access network node. When a radio connection is established, resources are assigned for carrying (i.e. communicating) user plane data between the UE and the eNB. User plane data may include traffic data, such as voice data, web browsing data, application data, and so forth.

Under certain scenarios, a state "mismatch" can occur between the UE and an eNB. In a state mismatch, a UE has a setting indicating that the UE is at a state (e.g. idle or connected state) that is different from a state indicated by a setting (or lack of a setting) at the eNB. For example, the UE may have a setting indicating that the UE is in a connected state, while the eNB may have a setting (or lack of a setting) indicating that the UE is in an idle state. In a first scenario, a state mismatch can occur due to failure of receipt by the UE of a connection release message sent by the eNB. In a second scenario, a state mismatch can occur during handover of the UE from a source cell to a target cell, when the UE does not successfully establish a connection in the target cell. There can be other scenarios in which state mismatch can occur between the eNB and the UE.

In the first scenario, a connection release message is sent by an eNB to release a connection between the UE and the eNB. For example, the connection release message can be an RRCConnectionRelease message that is sent by the eNB to release an RRC connection between the eNB and the UE. As part of releasing the connection, the eNB releases a connection context for the UE. The UE connection context includes various information associated with the UE in a connected state. For example, the UE connection context can include information regarding the identity assigned to the UE (e.g. cell radio network temporary identifier), the capabilities of the UE, a radio resource configuration of the UE, a radio bearer used by the UE for communicating data, a security configuration for the UE, and so forth. Once the UE connection context is released (i.e. removed or terminated) by the eNB, the eNB considers the UE to be in an idle state and to no longer have a connection with the eNB.

During the time that the eNB is without the connection context of a UE (e.g. after a release of an RRC connection with the UE or prior to the initiation of an RCC connection with the UE), the eNB is unaware of the UE (stated differently, the UE is unknown to the eNB).

In some examples, the connection release message can be sent by the eNB in an acknowledged mode, in which the eNB waits for an acknowledgement of the connection release message from the UE before releasing the connection between the UE and the eNB. However, in some circumstances, after having retransmitted the connection release message a predetermined number of times, the eNB may release the connection context of the UE without having received, from the UE, an acknowledgement message associated with any of the transmitted connection release messages. As an example, the eNB may believe that the UE has lost communication in a cell, such as in cases the eNB assumes that the UE has switched off suddenly or lost power. In the foregoing circumstances, if the eNB does not receive an acknowledgement for the connection release message within a specified time interval and/or after a predetermined number of the message retransmissions, the eNB may release the connection context for the UE.

From the perspective of the UE, however, the UE may still believe that its connection with the eNB is valid (i.e. the UE's setting indicates that the UE is in a connected state and therefore the connection with the eNB has not been released). The UE may have failed to receive any connection release message on a downlink control channel, because the UE may be unable to decode a Physical Downlink Control Channel (PDCCH) addressed to itself, due to an issue in the downlink when the connection release messages were transmitted to the UE. For example, timing drift may have occurred at the UE, which causes the UE to lose synchronization on the downlink and would prevent the UE from receiving a downlink control messages such as a connection release message from the eNB until the UE resynchronizes its receiver timebase. As a result, the UE's setting would continue to indicate that the UE is in a connected state, while a setting (or lack of a setting) of the eNB indicates that the UE is no longer in the connected state (i.e. the connection between the UE and the eNB has been released).

In the second scenario, state mismatch can occur during handover of the UE from a source cell to a target cell. A source eNB (at the source cell) can prepare a target eNB (at the target cell) for performing a handover. The preparation can include sending the connection context of the UE from the source eNB to the target eNB. In some cases, the source eNB may prepare multiple target eNBs that may be candidate targets for the handover.

Various factors may cause a delay in the execution of the handover. For example, there may be a delay in the UE receiving a handover command from the source eNB, such as due to a poor radio connection in the source cell leading to multiple re-transmissions of the handover command. Another factor that can lead to a delay in execution of the handover can be a poor radio condition in the target cell, which can result in signals sent by the UE being lost in the target cell and therefore not received by the target eNB. For example, the signals sent by the UE can include signals associated with a random access procedure, which is used by the UE to associate itself with the target eNB and acquire resources for communicating with the target eNB.

As a result of the delay in performing the handover, a target eNB may release the UE's connection context that the target eNB previously received from the source eNB. The target eNB releases the UE's connection context because the target eNB assumes the handover may fail due to the target eNB having not detected the expected UE within the target cell within a specified period of time. There can potentially be multiple candidate target eNBs that are prepared by the source eNB for handover. However, a number of the candidate target eNBs (including the target eNB itself in the present example) may not detect the UE even though each of the candidate target eNBs (including the target eNB) has been prepared for the handover. As such, each candidate target eNB may elect to release the UE's connection context if the UE is not detected by the respective candidate target eNB within a specified time period.

After the target eNB releases the UE connection context, the UE may turn up in the target cell (e.g. be detected by the target eNB within the target cell) and attempt a random access procedure. At this stage, a state mismatch will occur, since the UE has a setting indicating that the UE is in a connected state, while the eNB has a setting or lack of setting indicating that the UE is in not in a connected state, since the target eNB does not have (i.e. does not have stored or have access to) the connection context for the UE.

A state mismatch between a UE and an eNB can cause various issues, such as increased interference due to extra transmissions of messages like scheduling request and/or random access message and increased power usage at the UE (discussed in additional detail further below). In accordance with some implementations, to address issues associated with state mismatch between a UE and an eNB, the eNB can be configured to cause an early abort of a random access procedure by a UE, in response to the eNB detecting receipt of information associated with the UE that is indicative of the UE being (or operating as though) in a connected state, even though the eNB has released the connection context for the UE. Early abort of a random access procedure refers to any act taken to stop the random access procedure before usual completion of the random access procedure according to current wireless access technology standards. Usual completion of the random access procedure according to current wireless access technology standards refers to successful completion of the random access procedure, or alternatively, to unsuccessful completion of the random access procedure in which the UE has retransmitted a preamble or message (discussed further below) up to a specified maximum number of retransmissions.

FIG. 1 is a flow diagram of a process performed by an eNB according to some implementations. The eNB receives (at 102), from the UE, information relating to a random access procedure that is being performed by the UE. The information can include an identifier of the UE, for example C-RNTI (Cell Radio Network Temporary Identifier), or a dedicated preamble associated with a UE (discussed further below). More generally, the information can include information that is specific to (i.e. associated with) the UE, and which is used as part of the random access procedure.

Upon receiving the information, the eNB determines (at 104) whether or not the random access procedure is to be allowed to continue. For example, the eNB can determine whether the eNB is aware of the UE. The eNB is aware of the UE if the eNB has the connection context for the UE. If the eNB does not have the connection context for the UE, then the eNB is unaware of the UE. In other implementations, the eNB can decide that the random access procedure is to be aborted for a different reason, such as due to the eNB detecting unfavorable wireless conditions. Unfavorable wireless conditions can be determined based on one or more of the following factors in the uplink: heavy congestion, increased interference, increased signal attenuation, increased timing shift, increased frequency offset, and so forth. Unfavorable wireless conditions can alternatively include the following in the downlink: heavy congestion, detecting that a UE has apparently not received a random access response (RAR) and is re-attempting a random access procedure with a dedicated preamble (the RAR and dedicated preamble are explained further below), and so forth.

In response to determining that the random access procedure is allowed to continue, the eNB performs (at 106) further tasks associated with the random access procedure, including exchanging messages with the UE. However, if the eNB determines (at 104) that the random access procedure is to be aborted before the usual completion of the random access procedure, then the eNB sends (at 108) an abort indication to the UE to stop the random access procedure.

More generally, in accordance with some implementations of the present disclosure, the abort indication to stop the random access procedure is sent by the eNB to the UE (at 108) based on the information received from the UE (at 102).

The abort indication that is sent can include one or more of the following: a new message or a new control element not yet defined by current wireless access technology standards, such as 3GPP standards); an indicator in an existing message (an existing message is a message that is defined by current wireless access technology standards); or any other indication.

Two types of random access procedures can be performed by a UE: (1) contention-based random access procedure; and (2) contention-free random access procedure.

A random access procedure is initiated by the UE when the UE does not have assigned resources to communicate user plane data with an eNB. Since the UE is using a shared communication medium (shared with other UEs) in attempting to communicate with an eNB, there can be a possibility of collision among multiple UEs when the multiple UEs attempt to request access using corresponding random access procedures. Such random access procedures are referred to as contention-based random access procedures. Alternatively, the network can inform UE to use unique information to prevent the UE's request from colliding with requests from other UEs; this latter access that uses the unique information is referred to as a contention-free random access procedure.

Figure 2:
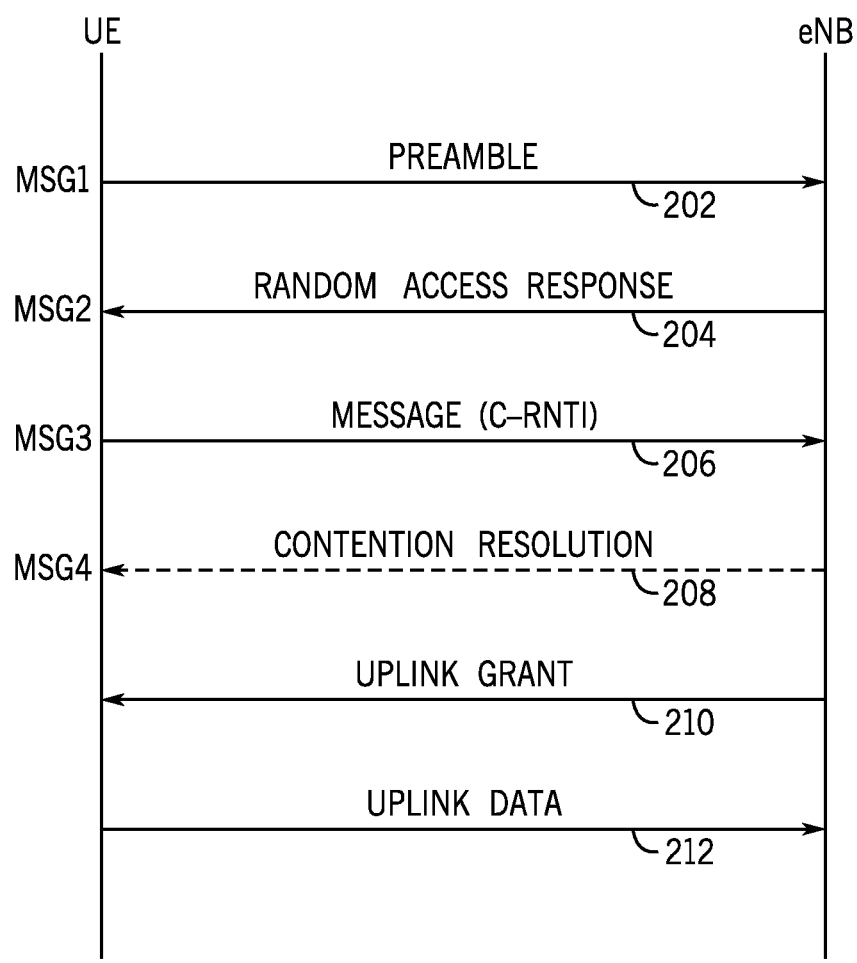
FIG. 2 is a flow diagram of an example random access procedure.

FIG. 2 is a flow diagram of a contention-based random access procedure, according to some examples. First, the UE selects a Physical Random Access Channel (PRACH) preamble randomly from a set of available preambles, and transmits (at 202) the selected preamble to the eNB during an opportunity to send the preamble on the PRACH. The transmitted preamble is included in a message referred to as "Msg1."

A preamble includes a specific pattern or signature. Different preambles can be used to differentiate requests from different UEs. However, if two UEs use the same preamble at the same time, then a collision may occur.

Upon detection of a preamble transmitted in a PRACH opportunity, the eNB sends (at 204) a Random Access Response (RAR) in the downlink, such as in a Physical Downlink Shared Channel (PDSCH). The downlink assignment of the RAR is signaled to a Random Access Radio Network Temporary Identifier (RA-RNTI), which is associated with the resource used for the transmission of the preamble by the Physical Downlink Control Channel (PDCCH). The RAR is referred to as message "Msg2" and can include uplink timing adjustment information and an uplink resource allocation. The RAR can also include a temporary Cell Radio Network Temporary Identifier (Temporary C-RNTI).

The uplink timing adjustment value in the RAR (Msg2) is used to inform the UE to change its timing so the UE can compensate for a round trip delay caused by the distance between the UE and the eNB. The uplink resource allocation in the RAR (Msg2) assigns an initial uplink resource, such as a resource in the Physical Uplink Shared Channel (PUSCH), to the UE for use in further communication.

Using the uplink resource allocated in the RAR, the UE can transmit (at 206) its assigned radio network identifier in a message referred to as "Msg3." An example of Msg3 is an RRCConnectionRequest message for connection establishment or RRCConnectionReconfigurationComplete for handover completion, sent by the UE. If the UE is in a connected state, then the UE would already have been assigned a C-RNTI, in which case the assigned C-RNTI is included in Msg3 as a C-RNTI Medium Access Control Control Element (MAC CE). The C-RNTI is different from the temporary C-RNTI included in the RAR (Msg2). The UE which transmitted C-RNTI MAC CE in Msg3 considers that contention is resolved and the random access procedure is successfully completed when it receives the following response as Msg4 (contention resolution message): (1) PDCCH transmission addressed to the C-RNTI and containing an uplink grant for a new transmission (if the random access procedure was initiated by the MAC sublayer itself); or (2) PDCCH transmission addressed to the C-RNTI (if the random access procedure was initiated by a PDCCH order).

A C-RNTI is used to identify the UE during exchange of information with an eNB over the air. The C-RNTI can be assigned during the setup of an RRC connection between the UE and the eNB, and is valid only for that RRC connection within a cell.

For the UE without the assigned C-RNTI, Msg3 includes a Service Data Unit (SDU) to be transmitted in a Common Control Channel (CCCH SDU). The UE that transmitted the CCCH SDU in Msg3 considers that contention is resolved and the random access procedure is successfully completed when the UE receives the following response (a MAC packet data unit or PDU) addressed to the Temporary C-RNTI as Msg4 (contention resolution message sent at 208). In this case, the UE considers the Temporary C-RNTI as the assigned C-RNTI. The MAC PDU includes a UE Contention Resolution Identity MAC control element which matches the CCCH SDU transmitted in Msg3.

Next, the eNB sends (at 210) an uplink grant message, which can be included in a control channel such as the PDCCH that is addressed to the C-RNTI of the UE. The uplink grant message grants the UE access to an uplink resource, such as a PUSCH resource. To send the uplink grant message to the C-RNTI of the UE, the eNB has to have a stored connection context for the UE.

Once the uplink grant message is received by the UE, the UE can transmit (at 212) data on the assigned uplink resource.

To reduce the latency of a random access procedure in certain situations, the eNB may pre-assign a dedicated preamble to the UE. The pre-assigned dedicated preamble can then be used by UE in performing a contention-free random access procedure. A contention-free random access procedure can be performed during handover, for example.

The contention-free random access procedure includes tasks 202 and 204 of FIG. 2, in which Msg1 and Msg2 are exchanged. However, the contention-free random access procedure does not exchange Msg3 and Msg4. The contention-free random access procedure completes when the UE receives the RAR (Msg2) from the eNB. If the RAR indicates to the UE that the eNB has received the dedicated preamble, then the UE knows that no other UE has been assigned the dedicated preamble, so that further contention resolution would not have to be performed. As a result, the UE can complete the random access procedure once the UE receives the RAR, and the UE can start using dedicated physical channel resources signaled in a configuration message sent by the eNB, such as a RRCConnectionReconfiguration message sent by the source eNB during a handover procedure. The subsequent reconfiguration message may be sent by the target eNB to reconfigure radio resources for the UE in the target cell.

Issues Associated with State Mismatch

The following are examples of some issues that may occur due to state mismatch. Certain issues may occur during handover scenarios, while other issues may occur during non-handover scenarios.

In a first handover scenario, in which a UE has been pre-assigned a dedicated PRACH preamble, the UE would end the random access procedure in the target cell upon receiving RAR (Msg2) containing a Random Access Preamble identifier that corresponds to the dedicated preamble. At this stage, the UE has a setting which indicates that the UE is in a connected state and considers that its C-RNTI is valid, and that any dedicated connected mode parameters received in a handover command (sent by a source eNB) are also valid. As a result, the UE thinks the handover is successful and may start communicating with the target eNB on dedicated resources.

However, as noted above, the target eNB may have released the UE's connection context, which can lead to failure in receiving, by the target eNB, of an RRCConnectionReconfigurationCompletion message, which is sent by the UE to the target eNB in response to the RRCConnectionReconfiguration message discussed above. The failure to receive the RRCConnectionReconfigurationCompletion message is due to integrity checking by the target eNB that is based on presence of the UE's connection context. As part of the integrity checking, the target eNB may simply ignore the RRCConnectionReconfigurationCompletion message sent by the UE if the target eNB determines that the target eNB does not have the UE's connection context.

The UE may subsequently attempt to retransmit RRCConnectionReconfigurationComplete and send data on the uplink to the target eNB, but would not receive any acknowledgements of the transmitted or retransmitted uplink information. As a result, the UE would perform a number of retransmissions (e.g. Radio Link Control or RLC re-transmissions) of the uplink data until a maximum number of retransmissions have been reached. At that point, the UE can initiate a connection re-establishment procedure, which will likely fail due to the fact that no UE connection context is available at the target eNB. The retransmissions of uplink information can cause increased uplink interference and increased power consumption at the UE, which can cause battery drain at the UE.

In a second handover scenario, the UE does not have a pre-assigned dedicated PRACH preamble. In this scenario, the random access procedure is a contention-based random access procedure, such as that depicted in FIG. 2. After failure of the contention-based random access procedure, the UE can initiate a connection re-establishment procedure, which would fail because the target eNB has already released the UE connection context.

During the contention-based random access procedure, the UE uses its assigned C-RNTI in Msg3. However, the target eNB may not recognize the C-RNTI (unless the C-RNTI has been re-allocated to another UE), and hence the target eNB cannot respond to Msg3. The UE can continue to use the PRACH resources until the maximum allowed random access transmissions have been reached, at which time the UE would indicate a random access failure message to upper protocol layers of the UE. The upper layers of the UE may initiate RRC Connection Reestablishment procedure. However the procedure may likely fail because the UE connection context is likely released by a target eNB which receives a RRC Connection Reestablishment Request message from the UE. Note that the random access procedure is performed by a lower protocol layer in the UE, such as the Medium Access Control (MAC) layer.

The multiple random access transmissions made by the UE can cause increased interference with other UE transmissions on the PRACH, and can drain the battery of the UE. Moreover, in the case where the target eNB has already reassigned the C-RNTI to another UE, the target eNB may respond incorrectly thinking that the request is from the other UE that has been reassigned the C-RNTI, which can cause an issue with the other UE (since the other UE may not be expecting a random access procedure message from the target eNB). In order to avoid the above situation, the eNB should not assign the C-RNTI to another UE for a certain duration after the eNB releases the connection context associated with the C-RNTI due to error situations described further above.

The following describes issues associated with state mismatch in non-handover scenarios. In a first non-handover scenario, a UE is uplink synchronized. In a second non-handover scenario, a UE is not uplink synchronized.

An E-UTRA system is a synchronous system in which uplink orthogonality is either partly or fully obtained by ensuring that UE transmissions in the uplink from various UEs arrive substantially at the same time at the eNB. Uplink orthogonality refers to uplink signaling sent by different UEs being orthogonal to each other, which leads to reduced interference between such signals. Initially the UE acquires downlink timing by finding the primary synchronization sequence (PSS) and/or secondary synchronization sequence (SSS) transmitted by an eNB, and synchronizing the UE's downlink timing to the PSS and/or SSS.

Since different UEs may be at different distances from the eNB, the uplink transmissions by the different UEs may be associated with different propagation delays. To ensure that uplink transmissions from different UEs in a given subframe arrive substantially at the same time at the eNB, the timings of the uplink transmissions from the UEs are advanced (as compared to the timings of received downlink transmissions from the eNB). The timing advances of UEs at different distances from the eNB are different.

Upon obtaining the downlink timing, a UE initially performs a random access procedure, such as shown in FIG. 2. Through this procedure, the UE obtains the uplink timing advance value, at which point the UE is considered to be uplink synchronized. The eNB then maintains the uplink synchronization of the UE by continuously monitoring the timings of uplink transmissions from the UE and sending adjustment to the timing advance value to the UE when appropriate.

The eNB also controls whether or not the UE is in an uplink synchronized state in uplink by configuring a timer at the UE. In some examples, this timer is referred to as a Time Alignment Timer (TAT). When the TAT expires, the UE considers itself to be no longer uplink synchronized (unless the TAT is reset by a new timing advance command from the network). When the UE is not uplink synchronized, the UE is mandated by the current 3GPP specifications to relinquish all synchronous uplink resources (such as uplink control channel resources), after which the only uplink channel resource available for the UE is the Physical Random Access Channel (PRACH).

In the first non-handover scenario, while the TAT is still running, the UE considers that the UE is in the uplink synchronized state. In cells having relatively small coverage areas (e.g. a small cell such as a femto cell, pico cell, etc.), the TAT can be configured to have a very large value (or even an infinite value), since timing advance is negligible (due to the fact that UEs in a small cell are relatively close to the eNB of the small cell). As a result, even when there is no data transmission for a long period of time, the TAT does not expire, and the UE may think it still has access to all uplink synchronous resources. However, the eNB may consider that the communication with the UE is lost if no uplink control information is received for a long period of time, and thus may release the UE connection context and reassign the same uplink resources to one or more other UEs. Such uplink resources include periodic uplink control channel resources on PUCCH for transmission of Channel Quality Indicator (CQI), Precoding Matrix Indicator (PMI), etc. (which are monitored by a eNB for determining downlink channel quality) and PUSCH for transmission of a Sounding Reference Signal (SRS) (which is monitored by a eNB for determining uplink channel quality, to determine a timing advance value, and so forth). The UE is allowed to transmit on the uplink resources periodically if the UE is in the uplink synchronized state. Whenever the UE transmits on these uplink resources when there is a state mismatch, the UE may cause increased interference with uplink transmissions of other connected mode UEs.

Upon uplink data arrival at a lower protocol layer (e.g. MAC layer) in the UE, if the UE is configured to enable sending a Scheduling Request (SR), the UE transmits an SR to the eNB to request resource allocation in the uplink so that the UE can send the uplink data. However, the eNB may not respond to the SR if the UE connection context has been released. The UE retransmits the SR up to a specified maximum number of SR retransmissions, at which point the UE will trigger a random access procedure. This random access procedure would also fail, as discussed above. Repeated SR and random access procedures increase interference in the cell and can drain the UE's battery. If there is no uplink data from the UE detected by the eNB, the eNB currently has no mechanism to either note that the extra interference is being caused by a UE in a mismatched state, or to signal the UE to stop using the uplink resources.

In the second non-handover scenario, the UE is not in the uplink synchronized state. The UE can determine that it is no longer uplink synchronized when the TAT expires. As a result, the UE may only access the uplink resources by using a random access procedure. Since the UE is in a connected state, the UE includes its assigned C-RNTI in Msg3 of the random access procedure, which is not recognized by the eNB. In this scenario, the same issues as discussed above with the second handover scenario may be present.

Early Abort of a Random Access Procedure by an eNB

In accordance with some implementations, an eNB can perform early abort of a random access procedure in response to receiving information from the UE and determining that a condition is present that indicates that the random access procedure is to be aborted before the unsuccessful completion of the random access procedure defined in the current standards. For example, the information received can be a C-RNTI assigned to a connected state UE, and early abort should be performed if the eNB has already released the connection context for the UE. Alternatively, the information received can be a dedicated preamble that is assigned to the UE whose connection context has been released by the eNB.

Table 1 below summarizes various types of random access procedures according to E-UTRA.

TABLE 1

| Source | Contention | Msg3 | Msg4 | Cause | Type |
|---|---|---|---|---|---|
| Network | Contention-free | N/A | N/A | Handover | 1 |
| | | | | PDCCH order | 2 |
| | Contention-based | C-RNTI | PDCCH indication | PDCCH order | 3 |
| UE | | | | Handover | 4 |
| | | | UL grant | UL data | 5 |
| | | CCCH | DL PDU | Connection establishment | 6 |
| | | | | Connection re-establishment | 7 |

In Table 1 above, the "Source" column indicates whether an activity of the network or the UE caused performance of the random access procedure. The "Contention" column indicates whether the random access procedure is contention-based or contention-free. The "Msg3" column identifies the UE identity element included in Msg3 in a random access procedure, and the "Msg4" column identifies the contention-resolution element in Msg4 in a random access procedure.

For types 1 and 2, there is no Msg3 and Msg4, since these types correspond to contention-free random access procedures. For types 6 and 7, Msg3 contains a message (SDU) of a Common Control Channel (CCCH). For type 3, Msg4 is any PDCCH indication addressed to the UE's C-RNTI, which provides information to the UE regarding downlink data being transmitted by the eNB to the UE, such as on the physical downlink shared resource (PDSCH). For types 4 and 5, Msg4 is a PDCCH indication addressed to the UE's C-RNTI including a uplink grant. For types 6 and 7, Msg4 is a downlink packet data unit (PDU), containing the CCCH SDU included in Msg3.

The "Cause" column indicates the cause of the random access procedure. The cause of types 1 and 4 is a handover. The cause of types 2 and 3 is a PDCCH order, which is provided by a network to inform the UE that there is downlink data, and request the UE to perform the random access procedure. If the PDCCH order contains a dedicated preamble, then the UE can perform a contention-free random access procedure (type 2). If the PDCCH order does not contain a dedicated preamble, then the UE performs a contention-based random access procedure (type 3).

In Table 1 above, the "UL data" cause relates to a scenario where the UE in the connected state has uplink data to send, but the UE has no uplink resources and the uplink timing has not been maintained. In this case, the UE would perform a contention-based random access procedure to acquire the uplink resources (type 5). The type 6 random access procedure is caused by connection establishment, while the type 7 random access procedure is caused by connection re-establishment.

Random access procedures according to types 1-5 and 7 occur when the UE is in a connected state. Random access procedure according to types 6 occurs when the UE is in an idle state.

The solutions described below can be applied to random access procedures according to selected random access procedures from among types 1-7 in Table 1.

In some implementations, to address a state mismatch in a random access procedure according to type 3, 4, or 5, a new message can be used as the abort indication (sent at 108 in FIG. 1) for stopping the random access procedure. In some examples, this new message can be a new MAC control element (CE) that is sent on the downlink from the eNB to the UE. A "new message" is a message not defined by current wireless access technology standards. The new MAC CE can be generally referred to as an "abort MAC CE."

Figure 3:
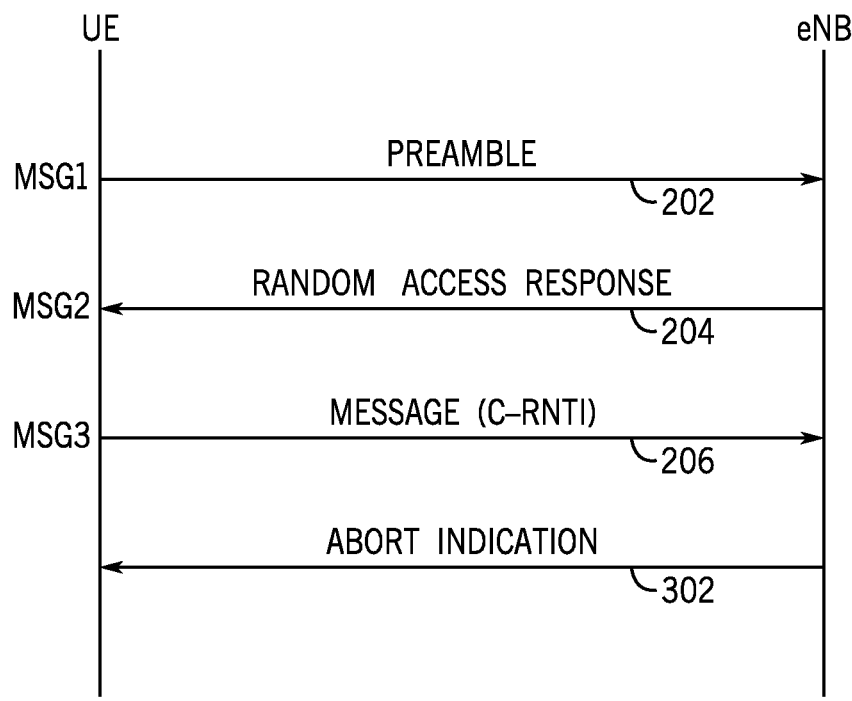
FIGS. 3 and 4 are flow diagrams of random access procedures that are subjected to early abort, according to various implementations.

An example contention-based random access procedure is shown in FIG. 3. Msg1, Msg2, and Msg3 are the same as Msg1, Msg2, and Msg3, respectively, in FIG. 2. A C-RNTI assigned to the UE in a connected state can be included in a MAC CE in Msg3 (206 in FIG. 3). When the eNB receives Msg3 with the C-RNTI for which the eNB does not have a connection context, the eNB can respond (at 302) with an abort indication sent to the UE, which according to this solution includes a downlink MAC packet data unit (MAC PDU) addressed to the C-RNTI, where the downlink PDU includes an abort MAC CE for stopping the random access procedure (based on the determination by the eNB that the eNB does not have the connection context corresponding to the C-RNTI). When a MAC layer in the UE receives the abort MAC CE, the UE stops the random access procedure and indicates random access abort to an upper protocol layer in the UE, such as an RRC layer. In response, the RRC layer in the UE releases or re-establishes the RRC connection.

The eNB can indicate, such as using an indicator in the abort MAC CE, to the UE to either release or re-establish the RRC connection. The decision by the eNB to indicate release or re-establishment of the RRC connection can be based on the eNB's determination of likelihood of success of re-establishment. For example, if multiple eNBs are prepared for handover and the target eNB lost the UE due to a poor radio condition, then the target eNB can indicate re-establishment with the hope that the UE would attempt to re-establish with another eNB (e.g. the source eNB of the handover procedure) that still has the UE's connection context. In another example, in a non-handover scenario, the eNB can indicate release because the UE connection context is not available in the network.

A similar solution as depicted in FIG. 3 can be applied to address state mismatch in random access procedures according to types 3 and 4 in Table 1. For example, the FIG. 3 solution can be used if any one or more of the following occurs: the eNB determines that the random access procedure is taking longer than expected, the eNB detects that wireless conditions are quickly deteriorating, and so forth. The eNB can choose to perform early abort of the random access procedure using the abort MAC CE to save UE resources.

In some examples, it can be assumed that an eNB does not immediately re-use the C-RNTI of a UE whose connection context has been released, because the C-RNTI space (space of available C-RNTIs) is relatively large. For example, the C-RNTI can be 16 bits long.

In specific examples, the abort MAC CE can be referred to as a Random Access Abort Command MAC CE, which can be identified by a MAC PDU subheader with a new LCID (e.g. 11010 as a binary number). The LCID is specified in 3GPP TS 36.321 Evolved Universal Terrestrial Radio Access (E-UTRA) Medium Access Control (MAC) protocol specification. The Random Access Abort Command MAC CE has a fixed size of zero bits. Upon receipt of the Random Access Abort Command MAC CE, the UE notifies release of the RRC connection to the upper protocol layers, including the RRC layer in the UE.

Alternatively, the abort MAC CE can be defined as a Random Access Abort Command MAC CE identified by a MAC PDU subheader with LCID (e.g. 11010 as a binary number), with a fixed size of one octet. The octet indicates the UE action to be performed after stopping the random access procedure. A first value of the octet indicates that the UE is to release the RRC connection. A second value of the octet indicates that the UE is to re-establish the RRC connection. Upon receipt of the foregoing MAC CE, the UE can notify upper layers to perform release or re-establishment of the RRC connection, depending upon the indicated UE action.

In alternative implementations, instead of using the abort MAC CE discussed above, the following solution can be used for addressing state mismatch in random access procedures according to types 3-5 in Table 1. In these alternative implementations, the abort indication is in the form of a connection release message that is sent by the eNB to the UE. An example of the connection release message is an RRCConnectionRelease message, which is used to cause release of an RRC connection. In some examples, the RRCConnectionRelease message can be sent in plaintext in a signaling radio bearer, such as signaling radio bearer SRB0, since the eNB does not have the UE's connection context. Sending the connection release message in plaintext refers to sending an unencrypted and without integrity protection. According to E-UTRA, a signaling radio bearer (SRB) is a radio bearer that is used for the transmission of certain control messages, including RRC messages for example.

In some implementations, an RLC transparent mode can be used for sending the RRCConnectionRelease message in plaintext in SRB0. With RLC transparent mode communication on SRB0, a transmission does not employ a sequence number, ciphering, or integrity protection and hence can be sent by an eNB to an UE and be processed and acted upon by the UE even when the eNB has no UE context. With this solution, the RRCConnectionRelease message in transparent mode on SRB0 is sent as the abort indicator (302 in FIG. 3). The RRCConnectionRelease message in RLC transparent mode can be sent on a Common Control Channel (CCCH).

The RRCConnectionRelease message in SRB0 is sent to the UE with the C-RNTI received in Msg3 (206 in FIG. 3) for which the eNB does not have a UE connection context. Since the transparent mode does not allow PDUs to be segmented, the RRCConnectionRelease message should not indicate optional information elements such as redirection. Sending the RRCConnectionRelease message in transparent mode can serve to start a new RRC connection such that communication that has been interrupted can be restarted with reduced latency. In some examples, when starting a new RRC connection, the UE can attempt to find a cell that employs a currently used frequency, unless the frequency is heavily congested. The UE may start a contention-based random access procedure to transmit an RRCConnectionRequest message. The UE does not have assigned C-RNTI and does not include the C-RNTI in Msg3; therefore, the eNB would respond with Msg4 and a connection establishment will be successfully completed.

To protect against a rogue eNB causing unauthorized connection releases using the connection release message sent in plaintext, a security mechanism can be provided. In some implementations, an eNB can include a token computed based on specified information. For example, the token can be a hash value based on the received Msg3, the C-RNTI in Msg3, and the system frame number (SFN) in which Msg3 was received. The UE can compare a value of the token received from eNB with a value of the token computed based on Msg3, the C-RNTI, and the SFN, that was transmitted by the UE. If the token values match, then the UE determines that the plaintext connection release message is authorized, and the UE can perform the connection release procedure in response to the plaintext connection release message.

Alternatively, to protect against unauthorized connection releases, the UE can process the plaintext connection release message sent on the CCCH during a contention resolution stage of a random access procedure.

In further alternative implementations, instead of using an abort MAC CE or a plaintext connection release message as discussed above, an abort indication can be included in a field contained in a MAC PDU header. Such further alternative implementations can be applied for addressing state mismatch in a random access procedure according to type 1 or 2 (contention-free random access procedure where the UE uses a dedicated preamble).

Figure 4:
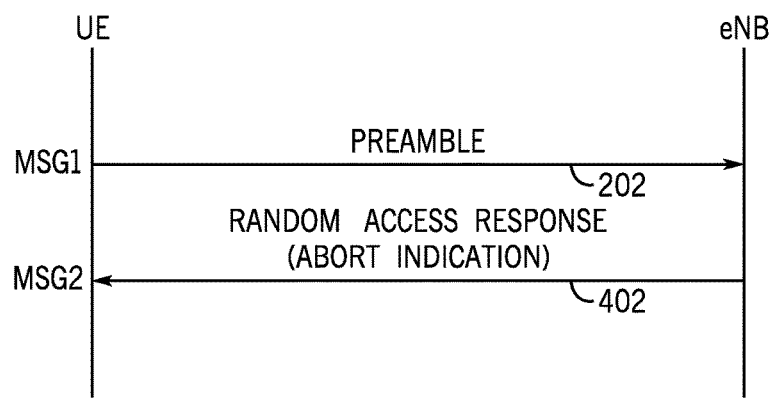

As shown in FIG. 4, the UE starts the contention-free random access procedure by sending (at 202) a dedicated preamble to the eNB. In response to detecting that the eNB does not have the connection context for the UE, the eNB sends (at 402) an RAR containing an abort indication to the UE, where the abort indication in this case is a field set to a specified value in a message header.

For example, the field in the message header can be a reserved ("R") bit in the header of the Random Access Response (RAR). The header can be a MAC header or another protocol header of a message. The MAC header can have various fields, including the "R" bit (the reserved bit). Normally, the "R" bit is set to 0. However, if the eNB wishes to abort the random access procedure, then the "R" bit can be set to "1", which causes the UE to stop the random access procedure. Also, the UE can notify upper layers to release or re-establish the RRC connection if the UE is in a connected state.

Using the "R" bit as the abort indication allows for backwards compatibility with legacy UEs which may not understand an abort indication. However, if backward compatibility is not a concern, then additional information can be added in the MAC header. In this case, the "R" bit can serve as a type indicator to indicate the type of the additional information included. In some examples, such additional information can indicate another candidate cell that is to be selected or reselected by the UE for re-establishing a connection. Note that this alternative may be applied to the other types 3-7 in the table 1. For example, when the eNB is heavily congested, the eNB may set the R bit to 1 in order to abort incoming random access requests regardless of the types of access.

UE-Initiated Release of Radio Connection

In alternative implementations, instead of or in addition to the foregoing solutions for early abort of the random access procedure, a UE may decide to transition to a more power efficient state (e.g. an idle state) rather than remain in a connected state, in the case where the UE has had no data to communicate (for some specified amount of time) and the UE continues to send certain uplink feedback signals on a periodic (or other intermittent) basis.

This solution can be used in a scenario where an eNB has sent a connection release message to the UE that was not received by the UE, and the TAT continues to run (has not expired) which leads the UE to consider it is uplink synchronized in a connected state. In some examples, even though the UE may not have data to send to the eNB, the UE may be configured to continue to send certain feedback signals, such as a channel quality indicator (which is a measure of channel quality), an SRS, and so forth, on a repeated basis. Repeated transmission of the feedback signals on the uplink can cause interference, and lead to battery drain at the UE.

Figure 5:
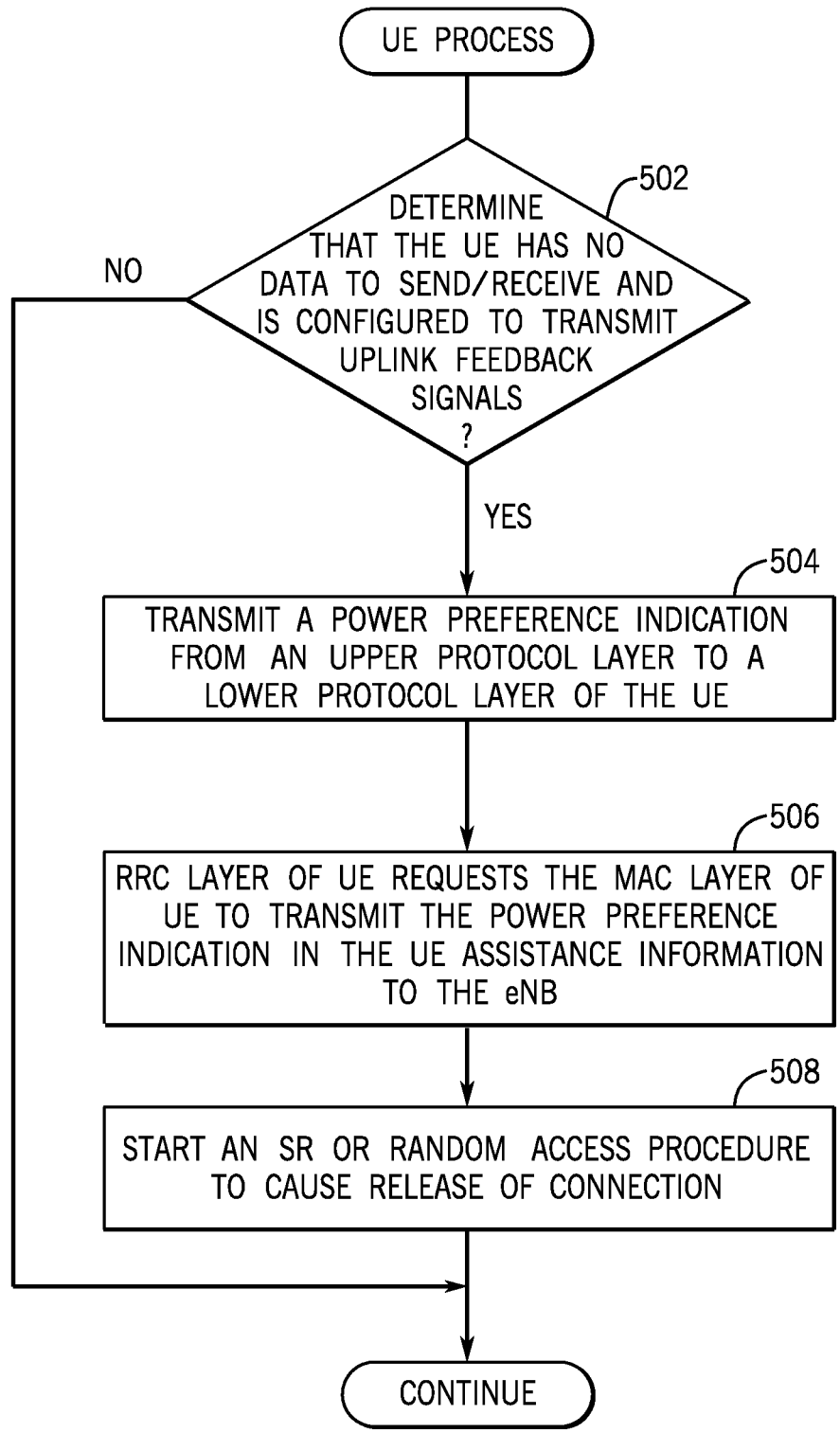
FIG. 5 is a flow diagram of a process of a user equipment (UE) for triggering release of a connection, according to further implementations.

As shown in FIG. 5, in response to determining (at 502) that the UE does not have data to send and to receive, and that the UE is configured to repeatedly send uplink feedback signals, an upper protocol layer (e.g. RRC layer) of the UE can transmit (at 504) an indication to the MAC layer of the UE to start a procedure that would lead to release of an RRC connection. The indication can be a power preference indication, which can be included in UE Assistance Information as described in 3GPP TS 36.331 Evolved Universal Terrestrial Radio Access (E-UTRA) Radio Resource Control (RRC) Protocol specification. More generally, the power preference indication can refer to an indication that can be used by the UE to indicate that the UE wishes to enter into a lower power consumption state. If the UE decides that it wishes to conserve power, such as in response to the determining at 502, the RRC layer of the UE can request the MAC layer of the UE to transmit the power preference indication in the UE Assistance Information to the eNB (at 506).

The MAC layer of the UE also can start (at 508) an SR or random access procedure in response to the power preference indication. As described further above, the SR and random access procedure will fail in when there is an RRC state mismatch. Triggering the sending of the UE Assistance Information allows the UE to remove itself from the problematic situation discussed above, by transitioning back to an idle state and starting with a new RRC connection. Note that this alternative solution may be used to reduce the time taken to transition back to an idle state, which can further reduce interference in the network and battery consumption at the UE.

Generally, in response to determining that the UE has no data to send and receive, and that the UE is configured to send an uplink feedback signal, the UE can generate a power preference indication to cause a procedure to be performed to cause the UE to transition from a connected state to an idle state and to start with a new RRC connection.

Re-Synchronization by the UE

As described above, one of the causes for state mismatch in a non-handover case is UE internal timing drift that prevents the UE from receiving a downlink connection release message. To correct such internal timing drift, if any, the UE may intermittently (e.g. periodically) resynchronize to a serving eNB. For example, the UE can perform resynchronization by acquiring downlink timing based on finding the PSS and/or SSS transmitted by the serving eNB.

The UE may choose to resynchronize when the TAT of the UE has expired or when there is no downlink data transmission for a specified amount of time. To avoid disruption to on-going communication, the UE may select an idle period or a non-active time of the UE to perform the resynchronization. The non-active time can be a time when the UE is not receiving data in a Discontinuous Reception (DRX) mode of operation. In DRX mode, the UE monitors PDCCH in an active time defined in 3GPP TS 36.321; in the remaining time phases, the receiver of the UE does not monitor PDCCH (no data transfer is expected).

Figure 6:
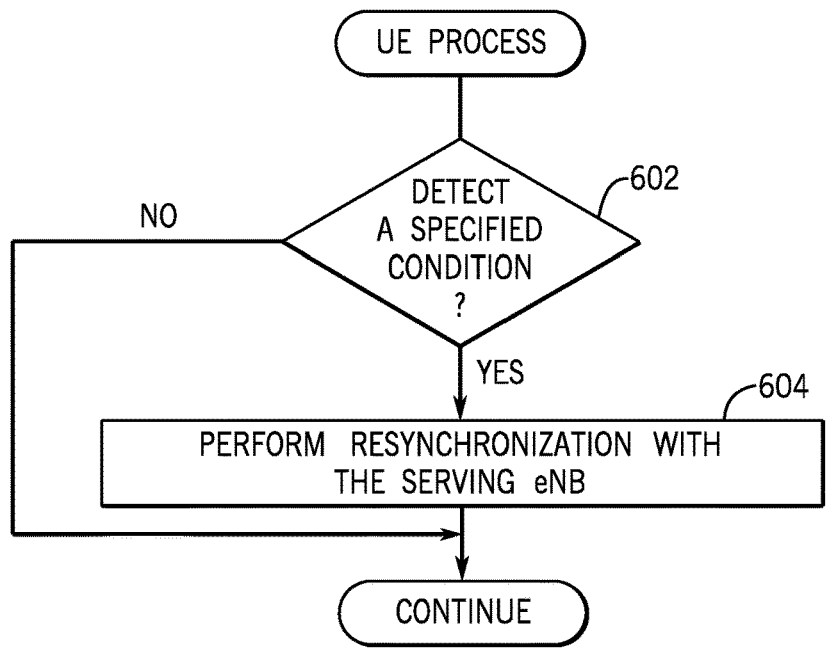
FIG. 6 is a flow diagram of a process of a UE for resynchronizing to a serving wireless access network node, according to alternative implementations.

As shown in FIG. 6, in response to detecting (at 602) a specified condition (e.g. TAT expiring or no downlink data received for a specified time period), the UE performs (at 604) resynchronization with the serving eNB.

Generally, in response to determining occurrence of a specified condition selected from among expiration of a timer relating to uplink synchronization or a determination that downlink data has not be received for more than a specified time period, the UE performs re-synchronization with a wireless access network node.

UE-Initiated Transition to the Idle State

As described above, when retransmissions of an SR reaches a specified maximum number, the UE can start a random access procedure. In alternative implementations, instead of triggering the random access procedure, the UE may instead transition to an idle state. This ensures that the UE comes out of the state mismatch scenario before causing congestion on the random access channel (RACH). In a further alternative implementation, the UE may further check that there has been no dedicated downlink data/signaling message to the UE in the immediate past (e.g. after the transmission of the first SR or in a predetermined period of time prior to reaching a maximum number of SR failed transmissions), which would further indicate that the network has likely released the UE context. On the other hand, if there has been a downlink dedicated data/signaling message transmission to the UE while the UE has been sending the SR messages in the uplink (with no response from the eNB for the SR), then that would indicate that the network does have the UE context and has been either choosing to ignore the SR transmissions or has not received the SR transmissions for other reasons (e.g. bad radio conditions and/or poor uplink conditions). Hence it would not be appropriate for the UE to go to the idle state in this case, and the instead, the UE should rather follow the normal procedures (i.e. initiate a random access procedure upon reaching a maximum number of SR attempts).

Figure 7A:
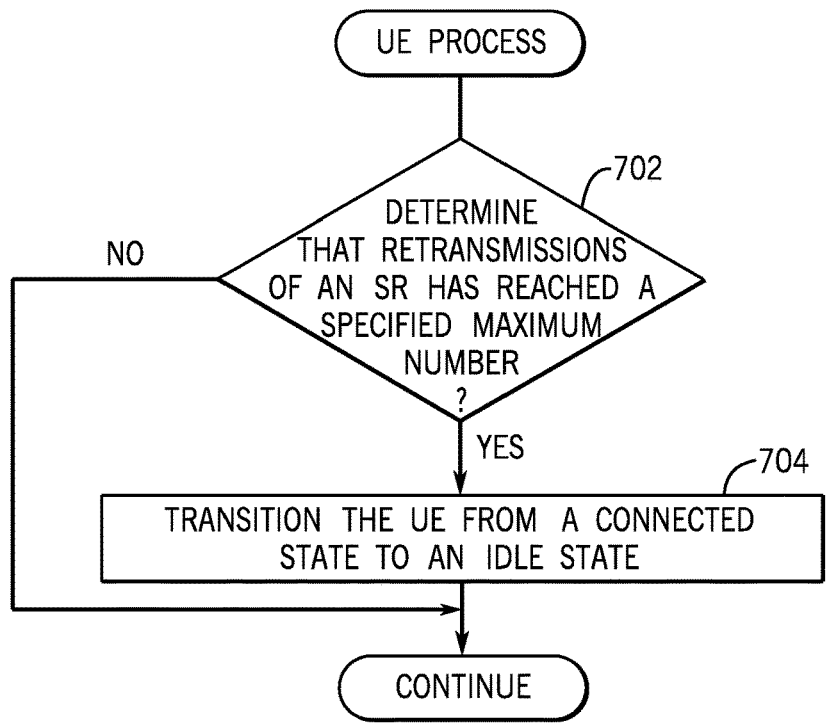
FIGS. 7A and 7B are processes of a UE for transitioning to an idle state, according to further alternative implementations.

In some implementations, as shown in FIG. 7A, in response to determining (at 702) that retransmissions of an SR has reached a specified maximum number, the UE transitions (at 704) from a connected state to an idle state.

Figure 7B:
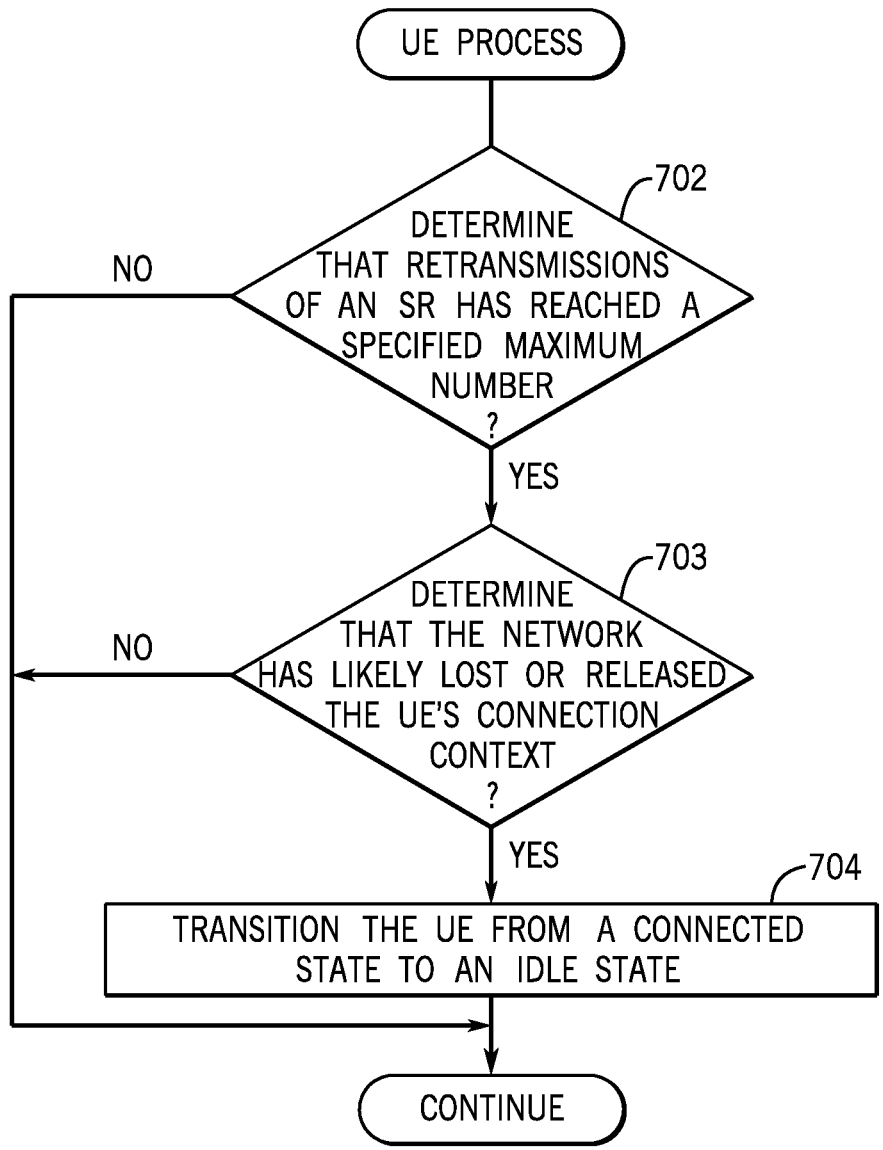

In alternative implementations, as shown in FIG. 7B, in response to determining (at 702) that a number of retransmissions of a scheduling request has exceeded a threshold, the UE determines (at 703) whether the network has likely lost or released the UE connection context. The UE may determine that the network has likely released or lost the UE connection context based on several conditions including one or more of the following: receiving no downlink data addressed to the UE in a predetermined period of time, or receiving no timing alignment commands in a predetermined period of time, or receiving no paging message addressed to the UE in a predetermined period of time, and so forth.

If the UE determines (at 703) that the network has likely lost or released the UE's connection context, then the UE transitions (at 704) from a connected state to an idle state.

In the above scenarios when the UE transitions to the idle state from the connected state, the UE may be further configured to store and report the failure cause (i.e. observed state mismatch condition or RACH failure etc) upon subsequently reconnecting to the network.

Generally, in response to determining that a number of retransmissions of a scheduling request has exceeded a threshold, the UE transitions from a connected state to an idle state.

System Architecture

Figure 8:
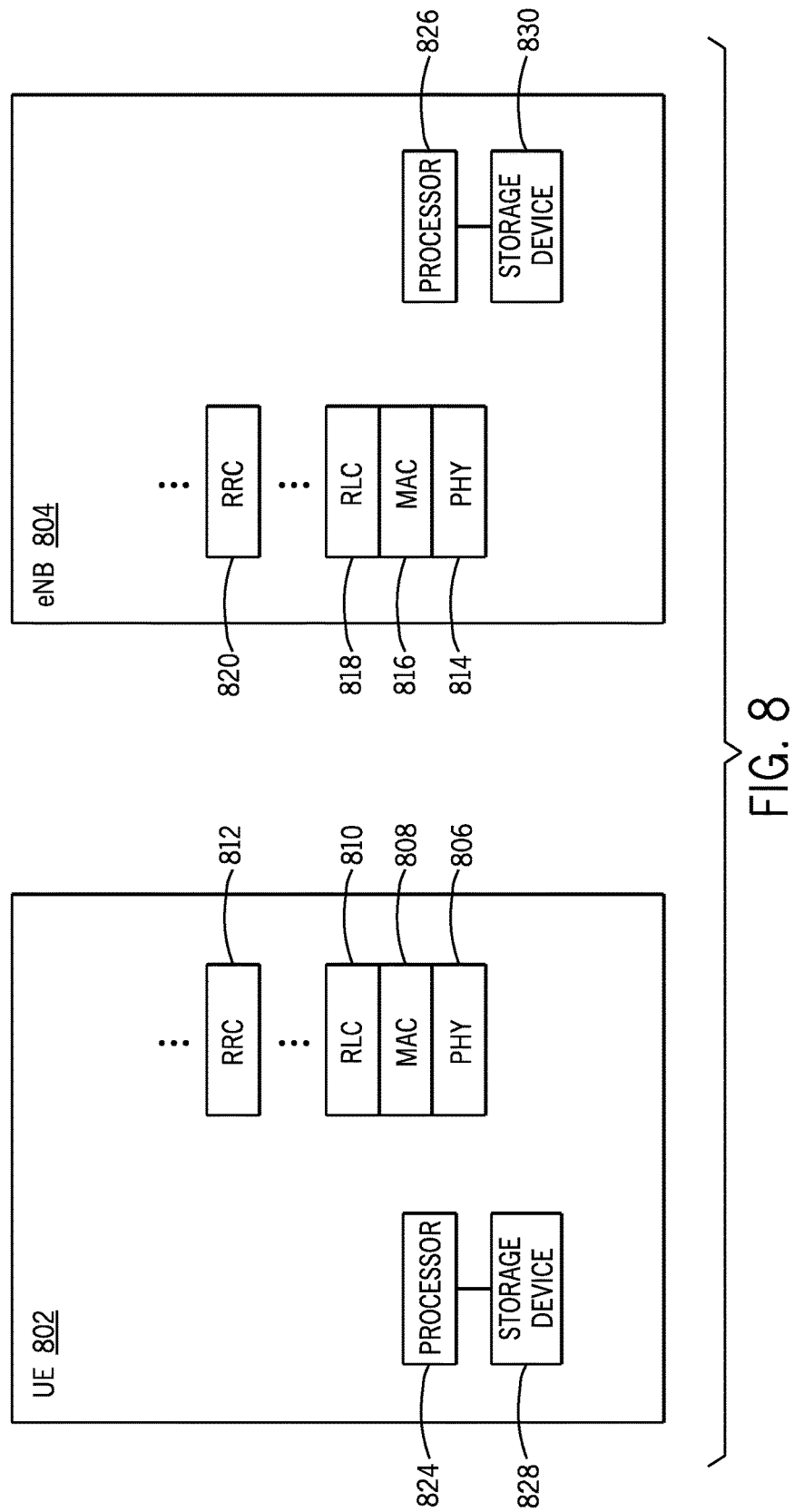
FIG. 8 is a schematic diagram of a UE and a wireless access network node, according to some implementations.

FIG. 8 shows example protocol stacks in a UE 802 and an eNB 804. The protocol stacks of the UE 802 and eNB 804 are part of communication components of the UE 802 and eNB 804, where a communication component is used for communicating with another node. The protocol stack in the UE 802 includes a physical (PHY) layer 806, a medium access control (MAC) layer 808, a radio link control (RLC) layer 810, and a radio resource control (RRC) layer 812, among other protocol layers. Control plane data of an upper layer (including the RRC layer 810) can be passed through the lower layers, including the RLC layer 810, MAC layer 808, and physical layer 806, for transmission to the eNB 804.

The protocol stack in the eNB 804 includes a physical layer 814, a MAC layer 816, an RLC layer 818, and an RRC layer 820, among other protocol layers. Although not shown, the eNB 804 also includes another protocol stack to communicate with a network node in a core network of a mobile communications network.

The RLC layer 810 or 818 can provide at least some of the following example functionalities, as described in 3GPP TS 36.322: transfer of upper layer packet data units (PDUs); error correction; concatenation, segmentation, and reassembly of RLC service data units (SDUs); reordering of RLC data PDUs; duplicate data detection; discarding of an RLC SDU; protocol error detection; and other tasks.

The RRC layer 812 or 820 can be used to perform at least some of the following example functionalities, as described in 3GPP TS 36.331: control of handover decisions based on neighbor cell measurements sent by the UE; transmission of a page to a UE; broadcast of system information; control of UE measurement reporting; and other tasks. In addition, the RRC layer 812 or 820 can also perform other tasks as discussed above.

The MAC layer 808 or 816 provides addressing and channel access control mechanisms, in addition to various tasks discussed above. The physical layer 806 or 814 can include networking hardware for transmitting signals over a wireless link.

The UE 802 further includes at least one processor 824 on which machine-readable instructions are executable. Similarly, the eNB 804 includes at least one processor 826 on which machine-readable instructions are executable. The machine-readable instructions can be part of the MAC or higher layers depicted in FIG. 8. A processor can include a microprocessor, microcontroller, processor module or subsystem, programmable integrated circuit, programmable gate array, or another control or computing device.

Data and instructions are stored in respective storage device(s) 828 (in the UE 802) and storage device(s) 830 (in the eNB 804), which can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   receiving, by a wireless access network node from a user equipment (UE) having a setting indicating that the UE is in a connected state with the wireless access network node, a dedicated preamble assigned to the UE for a contention-free random access procedure, the dedicated preamble specific to the UE and received from the UE as part of the contention-free random access procedure;
   in response to receiving the dedicated preamble, determining, by the wireless access network node, that the wireless access network node is without a connection context for the UE; and
   in response to the determining, sending, by the wireless access network node to the UE, an indication to stop the contention-free random access procedure.

2. The method of claim 1, wherein the indication sent to the UE is a field set to a specified value, the field being in a Medium Access Control (MAC) header in a message.

3. The method of claim 1, wherein the indication sent to the UE is an abort Medium Access Control (MAC) control element.

4. The method of claim 1, wherein the connection context for the UE comprises a radio resource configuration of the UE, and a radio bearer used by the UE for communicating data.

5. The method of claim 1, wherein the indication is included in a Random Access Response (RAR) sent by the wireless access network node to the UE in response to the dedicated preamble.

6. The method of claim 5, wherein the indication is included in a header of the RAR.

7. The method of claim 1, wherein the determining by the wireless access network node that the wireless access network node is without the connection context for the UE comprises determining by the wireless access network node that the wireless access network node has released the connection context for the UE, and
   wherein the sending of the indication to stop the contention-free random access procedure is in response to the wireless access network node determining that the wireless access network node has released the connection context for the UE.

8. A method comprising:
   receiving, by a wireless access network node from a user equipment (UE) having a setting indicating that the UE is in a connected state with the wireless access network node, information relating to a random access procedure, the information specific to the UE;
   in response to receiving the information, determining, by the wireless access network node, that the wireless access network node is without a connection context for the UE; and
   in response to the determining, sending, by the wireless access network node to the UE, an abort Medium Access Control (MAC) control element to stop the random access procedure.

9. The method of claim 8, wherein receiving the information comprises receiving an identifier assigned to the UE for use in communication.

10. The method of claim 9, wherein receiving the identifier comprises receiving a cell radio network temporary identifier, and wherein the abort MAC control element is addressed to the cell radio network temporary identifier.

11. The method of claim 8, further comprising:
    in response to determining that the wireless access network node has the connection context for the UE, communicating, by the wireless access network node with the UE, further information to continue the random access procedure initiated by the received information relating to the random access procedure.

12. The method of claim 8, wherein the determining comprises:
    checking stored information at the wireless access network node, wherein the determining that the wireless access network node is without the connection context for the UE is based on the checking of the stored information at the wireless access network node.

13. The method of claim 8, wherein the information relating to the random access procedure is received from the UE responsive to a handover of the UE to the wireless access network node from another wireless access network node.

14. The method of claim 8, wherein the abort MAC control element comprises a subheader including a predefined number to indicate that the abort MAC control element is for aborting the random access procedure.

15. The method of claim 8, wherein the determining by the wireless access network node that the wireless access network node is without the connection context for the UE comprises determining by the wireless access network node that the wireless access network node has released the connection context for the UE, and
    wherein the sending of the abort MAC control element to stop the random access procedure is in response to the wireless access network node determining that the wireless access network node has released the connection context for the UE.

16. A user equipment (UE) comprising:
    at least one processor; and
    a non-transitory storage medium storing instructions executable on the at least one processor to:
    send, as part of a random access procedure and while the UE has a setting indicating that the UE is in a connected state with a wireless access network node, information to the wireless access network node;

receive an abort Medium Access Control (MAC) control element sent by the wireless access network node, the abort MAC control element being based on the information and responsive to a determination by the wireless access network node that the wireless access network node is without a connection context for the UE, the connection context comprising a radio resource configuration of the UE, and a radio bearer used by the UE for communicating data; and stop the random access procedure in response to the abort MAC control element.

17. The UE of claim 16, wherein the information includes an identifier of the UE or a dedicated preamble assigned to the UE for the random access procedure.

18. The UE of claim 16, wherein the instructions are executable on the at least one processor to further:

determine that a number of retransmissions of a scheduling request has exceeded a threshold; and in response to the determining, transition the UE from a connected state to an idle state.

19. The UE of claim 16, wherein the at least one processor is configured to:

in response to determining that the UE does not have user plane data to communicate and that the UE is configured to repeatedly send uplink feedback signals, send an indication, and responsive to the indication, begin a random access procedure to release a radio connection.

20. The UE of claim 19, wherein sending the indication includes sending, by a Radio Resource Control (RRC) layer of the UE to a Medium Access Control (MAC) layer, a power preference indication to indicate a transition of the UE to a lower power mode, and the MAC layer is to begin, in response to the power preference indication, the random access procedure.

21. The UE of claim 16, wherein the at least one processor is configured to:

in response to expiration of a timer or failing to receive downlink data for greater than a specified time period, perform resynchronization with the wireless access network node, the resynchronization comprising acquiring a synchronization signal transmitted by the wireless access network node.

22. A wireless access network node comprising:

at least one processor; and a non-transitory storage medium storing instructions executable on the at least one processor to:

receive, from a user equipment (UE) having a setting indicating that the UE is in a connected state with the wireless access network node, a dedicated preamble assigned to the UE for a contention-free random access procedure;

in response to receiving the dedicated preamble as part of the contention-free random access procedure, check stored information at the wireless access network node, and based on the checking, determine that the wireless access network node is without a connection context for the UE; and in response to the determining, send, to the UE, an indication to stop the random access procedure to cause the UE to abort the contention-free random access procedure.

23. The wireless access network node of claim 22, wherein the instructions are executable on the at least one processor to send the indication to the UE in a Random Access Response (RAR) sent by the wireless access network node to the UE in response to the dedicated preamble.

* * * * *